United States Patent [19]
Turner et al.

[11] Patent Number: 5,901,650
[45] Date of Patent: May 11, 1999

[54] DYNAMIC BUFFER FOR CONVEYOR MODULES

[75] Inventors: Darryl Lane Turner, Kenton; Willard Anthony Stafford, Bellefontaine; William Newton Ramsey, Rushsylvania; Kevin Ray Chapman, Marysville; Mitsuhisa Sato; Hiroyuki Kachi, both of Dublin, all of Ohio

[73] Assignee: Honda of America Mfg., Inc., Marysville, Ohio

[21] Appl. No.: 08/950,229

[22] Filed: Oct. 14, 1997

[51] Int. Cl.$^6$ .......................................... B61J 3/00
[52] U.S. Cl. ................................... 104/88.01; 246/182 B; 246/182 C; 246/184; 29/430
[58] Field of Search ............................... 198/460.1, 460.3; 246/182 B, 182 C, 184; 104/88.01, 88.02, 88.03, 88.04, 88.05, 89, 93, 173.1, 173.2, 176, 178, 184, 27, 28, 29; 105/148, 149.2, 150; 29/428, 429, 430

[56] References Cited

U.S. PATENT DOCUMENTS

| | | |
|---|---|---|
| 3,648,346 | 3/1972 | Graham et al. . |
| 3,734,433 | 5/1973 | Metzner ............................... 104/88.02 |
| 3,968,559 | 7/1976 | Karlsson . |
| 4,627,361 | 12/1986 | Tarassoff .............................. 104/173.2 |
| 4,683,651 | 8/1987 | Taketani et al. . |
| 4,693,358 | 9/1987 | Kondo et al. . |
| 4,734,979 | 4/1988 | Sakamoto et al. . |
| 4,744,306 | 5/1988 | Kunczynski ........................... 104/173.1 |
| 4,744,500 | 5/1988 | Hatakeyama et al. . |
| 4,813,529 | 3/1989 | Kawai et al. . |
| 4,928,383 | 5/1990 | Kaczmarek et al. . |
| 4,942,823 | 7/1990 | Meindl ................................... 104/178 |
| 4,984,349 | 1/1991 | Ohta et al. . |
| 4,984,521 | 1/1991 | Riley .................................... 246/182 C |
| 5,155,690 | 10/1992 | Nomaru et al. . |
| 5,222,024 | 6/1993 | Orita et al. .......................... 246/182 C |
| 5,319,840 | 6/1994 | Yamamoto et al. . |
| 5,388,789 | 2/1995 | Rudershausen ...................... 246/182 C |
| 5,450,796 | 9/1995 | Sakagami ................................. 108/89 |
| 5,524,548 | 6/1996 | Fox ........................................ 104/89 |
| 5,664,323 | 9/1997 | Ishida et al. . |
| 5,669,309 | 9/1997 | Carlton et al. . |

*Primary Examiner*—Mark T. Le
*Attorney, Agent, or Firm*—Pearne, Gordon, McCoy & Granger LLP

[57] ABSTRACT

A method of operating an automotive production line including the steps of advancing a plurality of self-propelled carriages along a conveyor of the production line. The carriages are continuously advanced at a fixed operational speed and a fixed operational pitch to obtain a fixed processing time at a plurality of work stations along the production line. Any one of the carriages are stopped when a reduced pitch is obtained due to a stoppage of the immediately preceding carriage. The reduced pitch is less than the operational pitch and is preferably the minimum pitch available between the carriages. Stopped carriages are restarted when the reduced pitch returns to the operational pitch due to the restarting of the immediately preceding carriage. Production losses are reduced by continuing operations upstream of a stoppage to form a dynamic online buffer upstream of the stoppage. Production losses are further reduced when the dynamic online buffer is utilized to prevent the formation of a gap due to a subsequent stoppage located upstream of the dynamic online buffer. Production losses are even further reduced when previously existing gaps located upstream of the stoppage are closed as a result of continuing operations upstream of the stoppage.

23 Claims, 6 Drawing Sheets

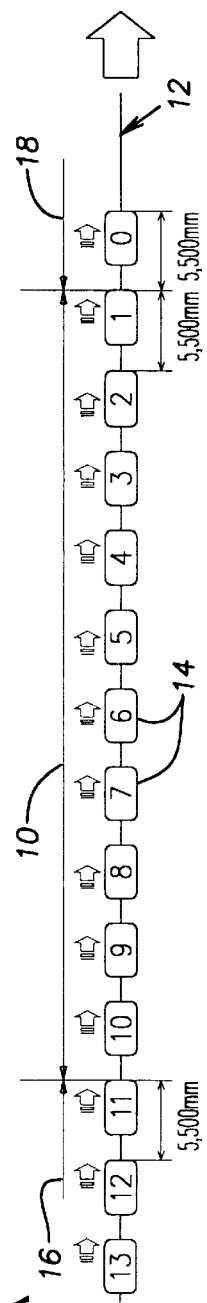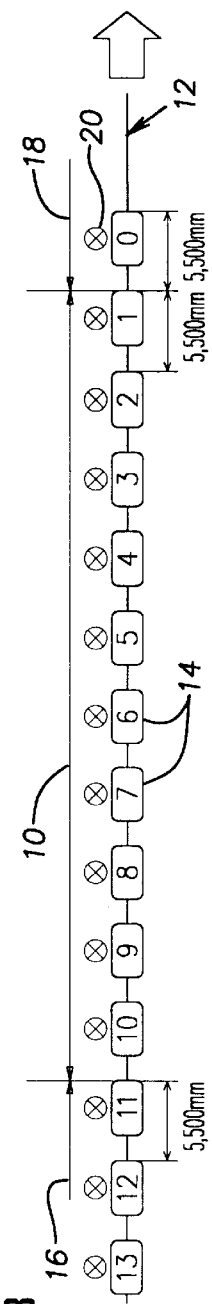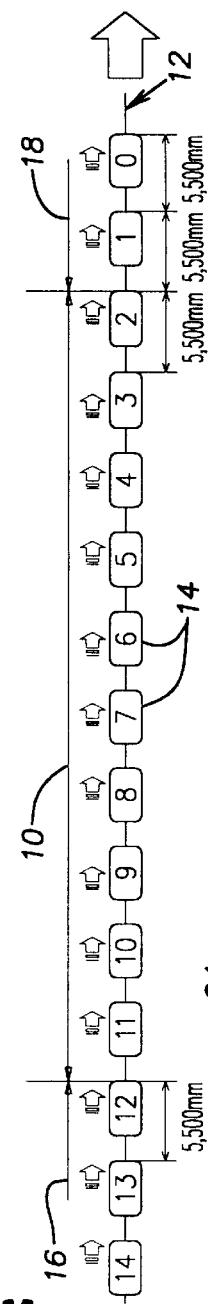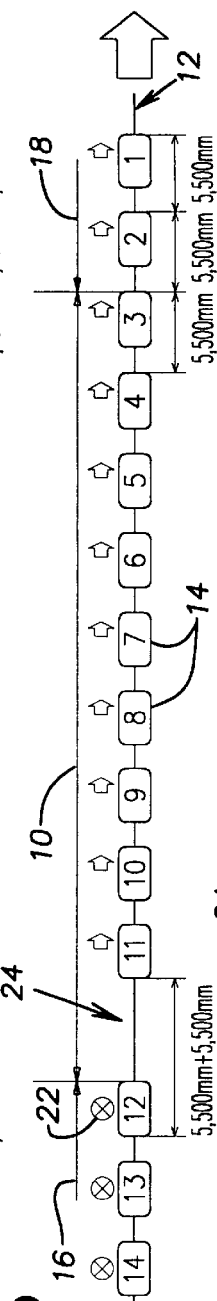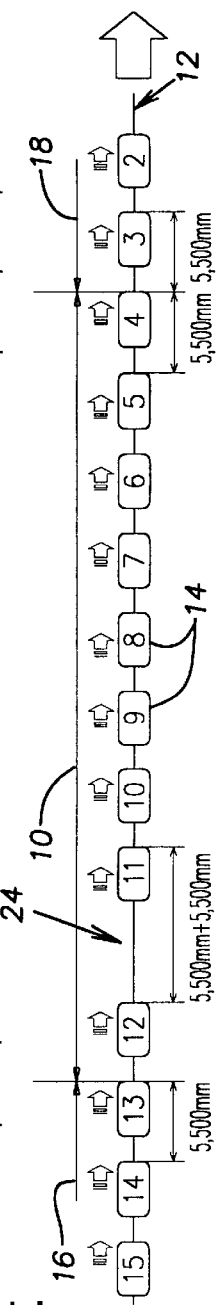

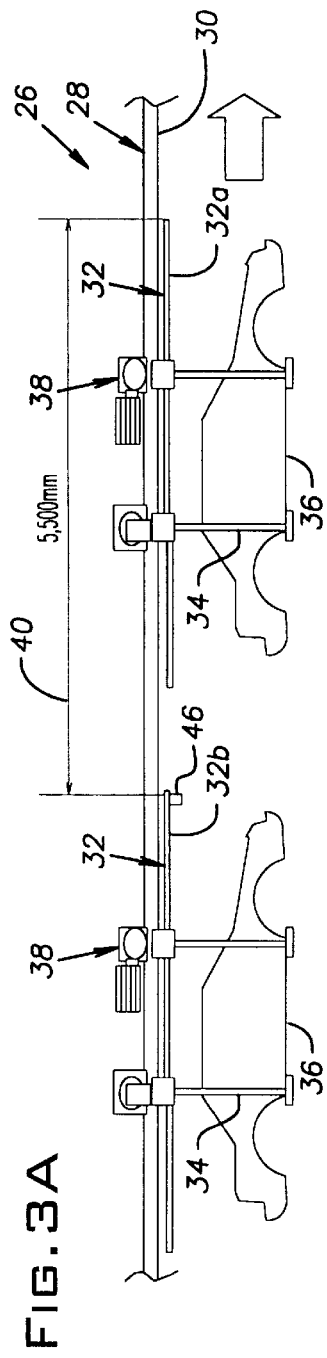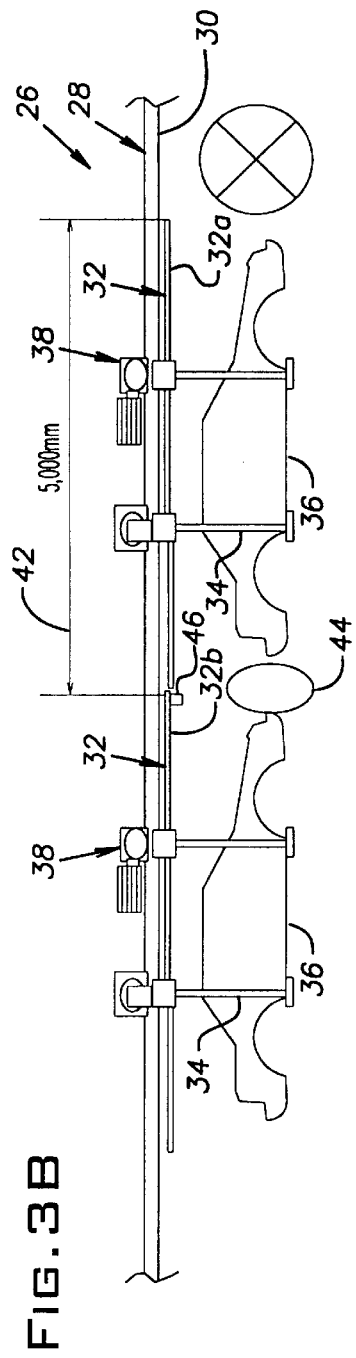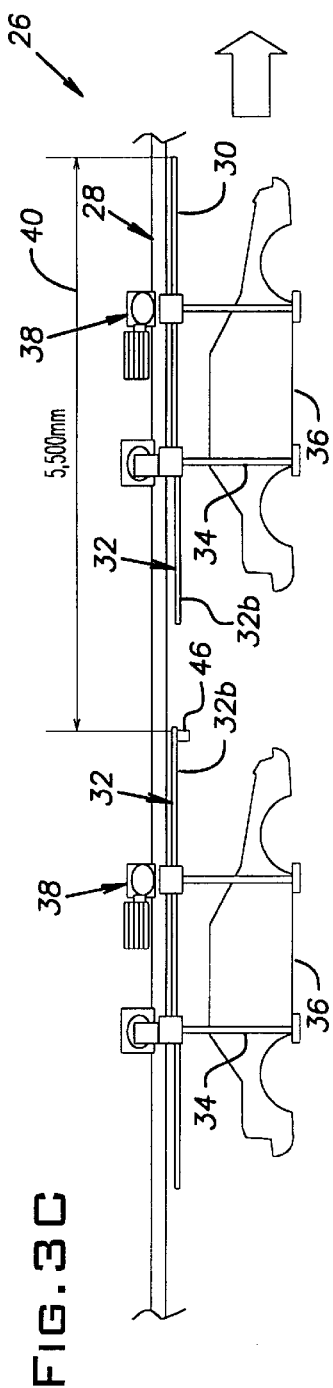

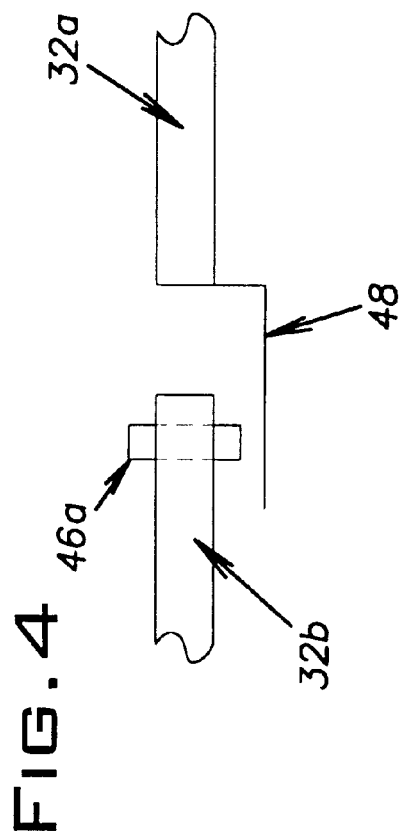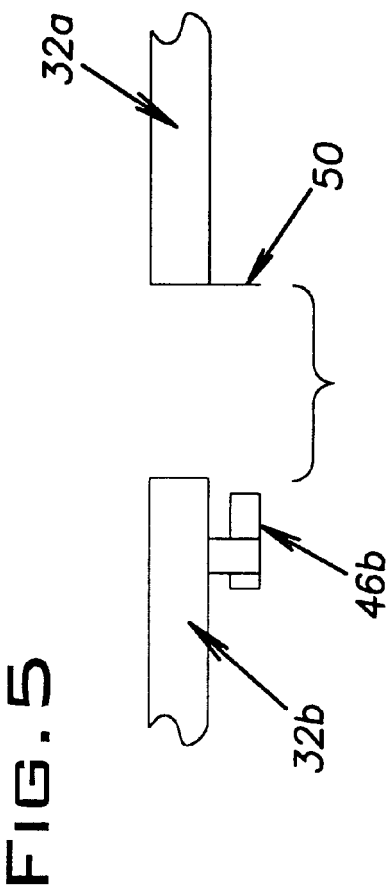

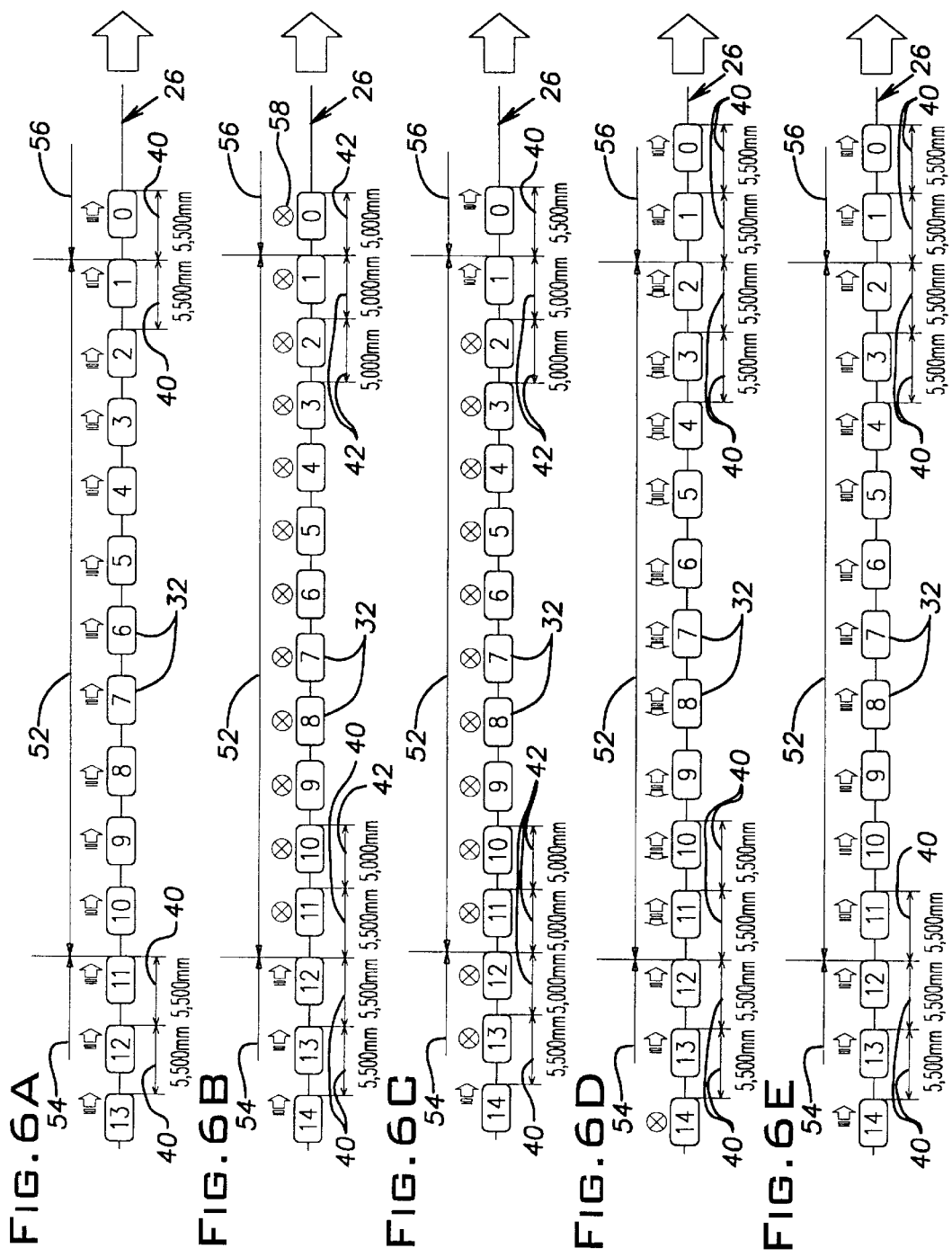

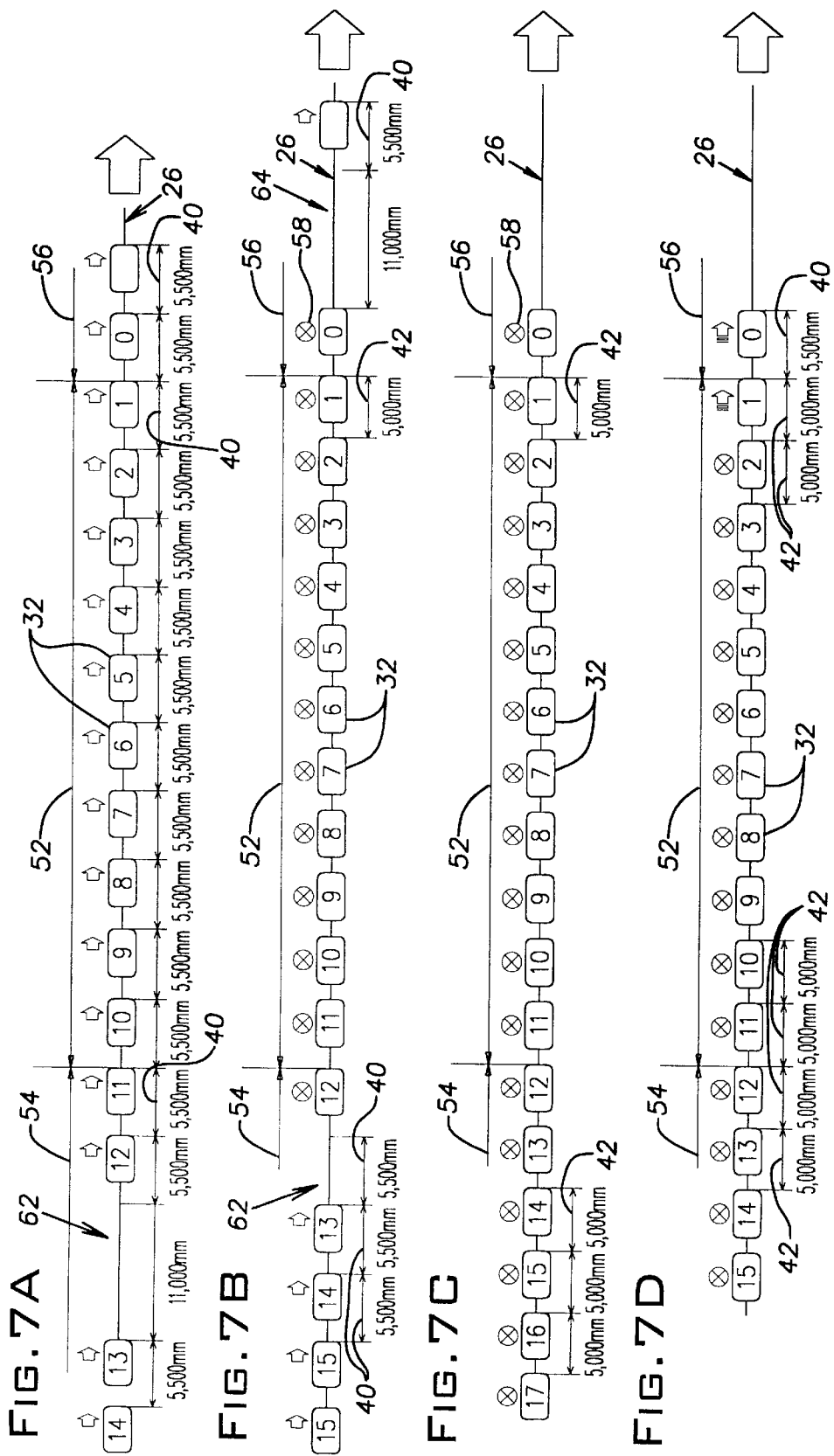

DYNAMIC BUFFER FOR CONVEYOR MODULES

BACKGROUND OF THE INVENTION

The present invention generally relates to a method of operating a production or assembly line and, more particularly, to a method of operating a production line including self-propelled carriages or modules for transferring workpieces along machines in work zones for assembling and machining the workpieces.

The automobile industry has some of the most advanced automated production lines in the world. The production lines include automatic workpiece feed means or conveyors which carry the workpieces through a series of work stations or zones having industrial robots to effect various operations such as assembling, coating, welding, and other processes. The conveyor typically includes self-propelled carriages or cars which individually transfer the workpieces along a guide rail or track along the production line. The self-propelled carriages are desirable because they can start-up and stop automatically and can easily increase speed into or out of a work zone having automated equipment.

Flow of the carriages along the production line requires each of the assembly operations to have a fixed processing time. The carriages, therefore, move at a fixed speed and are spaced by a fixed pitch to provide the required processing time for each of the operations along the assembly line.

FIGS. 1A to 1E illustrate a work zone 10 of a production line 12 wherein a plurality of carriages 14 are entering from a preceding work zone 16 and are exiting to a subsequent work zone 18. In FIG. 1A, the carriages 14 are continuously moving at a fixed operational speed and a fixed operational pitch in a forward direction as indicated (left to right as shown in FIG. 1A).

FIG. 1B illustrates a first trouble spot or stoppage 20 which has occurred along the production line 12 wherein one of the carriages 14 has been stopped for some reason such as a production or equipment problem. In the illustrated example, the last carriage 14 (carriage No. 0) in the subsequent work zone 18 has been stopped. When the carriage 14 (carriage No. 0) is stopped, each carriage 14 upstream of the stopped carriage 14 (carriage No. 0) must also stop so that the fixed operational pitch is maintained. The stoppage of one carriage 14, therefore, stops the entire portion of the production line 12 which is upstream of the stopped carriage 14 (carriage No. 0). It can be appreciated that stopping the entire upstream portion of the production line 12 results in lost production.

When the stopped carriage 14 (carriage No. 0) is restarted, each of the upstream carriages 14 are also immediately restarted so that the fixed operational pitch is maintained as illustrated in FIG. 1C. As the carriages 14 forwardly move along the production line 12 after restarting, they continue to move at the fixed operational pitch and the fixed operational speed. As shown in FIG. 1D, when an upstream carriage 14 (carriage No. 12) is stopped due to a second trouble spot or stoppage 22, each carriage 14 upstream of the stopped carriage 14 (carriage No. 12) must stop so that the fixed operational pitch is maintained. Each carriage 14 downstream of the stopped carriage 14 (carriage No. 12), however, continues to forwardly move along the production line 12. Therefore, a space or gap 24 forms between the stopped carriage 14 (carriage No. 12) and the forwardly adjacent carriage 14 (carriage No. 11) which continues to proceed along the production line 12.

When the stopped carriage 14 (carriage No. 12) is restarted, each of the upstream carriages 14 are also immediately restarted as shown in FIG. 1E. After restarting, the carriages 14 all forwardly move along the production line at the fixed operational pitch and the fixed operational speed. It is noted however, that the gap 24 which was developed by the second stoppage 22 remains and progresses along the production line with the carriages 14 at the fixed operational speed. It can be appreciated that the gap 24 results in lost production by the production line 12. In the illustrated example, the second stoppage 22 resulted in a gap 24 equivalent to one missing carriage 14. It should be noted, however, that stoppages of longer duration result in gaps equal to additional missing carriages 14.

FIGS. 2A to 2D show the effect of continued operations upstream of the stoppage when there is already a gap 24 located upstream of the stoppage. In FIG. 2A, the carriages 14 are continuously moving at the fixed operational speed and the fixed operational pitch in a forward direction as indicated (left to right as shown in FIG. 2A). A gap 24a is present between two of the carriages 14 which was formed downstream of a previous stoppage. In the illustrated example, the gap 24a is located in the preceding work zone 16 between the second and third carriages 14 (carriage Nos. 12 and 13). The illustrated gap 24a is equivalent to two missing carriages 14. It should be noted, however, that the gap 24a could be equal to a fewer or greater number of missing carriages 14.

FIG. 2B illustrates the first trouble spot or stoppage 20 which occurred along the production line 12. When the carriage 14 (carriage No. 0) is stopped, each carriage 14 upstream of the stopped carriage 14 (carriage No. 0) must also stop so that the fixed operational pitch is maintained. The stoppage of one carriage 14, therefore, stops the entire portion of the production line 12 which is upstream of the stopped carriage 14 (carriage N. 0). Therefore, the size of the gap 24a does not change.

Each carriage 14 downstream of the stopped carriage 14 (carriage No. 0) continues forward along the production line 12. FIG. 2B illustrates the production line 12 at the instant when the carriages 14 preceding the stopped carriage have progressed a distance equal to twice the fixed pitch. Therefore, another gap 24b has formed downstream of the stoppage 20.

FIG. 2C illustrates the production line 12 at the instant when the carriages 14 preceding the stopped carriage have progressed a distance equal to four times the fixed pitch. The size of the upstream gap 24a again has not changed because all of the carriages 14 located upstream of the stoppage 20 have remained stopped. The size of the downstream gap 24b, however has grown to four times the fixed pitch because the carriages 14 located downstream of the stoppage 20 continue to advance forward.

As shown in FIG. 2D, when the stopped carriage 14 (carriage No. 0) is restarted, each of the upstream carriages 14 are also immediately restarted so that the fixed operational pitch is maintained. As the carriages 14 forwardly move along the production line 12 after restarting, they continue to move at the fixed operational pitch and the fixed operational speed. The size of the upstream gap 24a has not changed because all of the carriages 14 located upstream of the stoppage 20 restarted together. Therefore, the production loss due to the gap 24a has remained. Accordingly, there is a need in the art for a method of operating an assembly line which reduces production losses such as those due to stoppages along the assembly line.

BRIEF SUMMARY OF THE INVENTION

The present invention provides an improved method of operating a production line which overcomes at least some of the above-noted problems of the related art. According to the method of the present invention, a plurality of carriages are advanced along the production line at an operational speed and an operational pitch to obtain a fixed processing time. Any one of the carriages is stopped when a reduced pitch is obtained due to a stoppage of an immediately preceding one of the carriages. The reduced pitch is less than the operational pitch and is preferably the minimum pitch available between the carriages. A stopped one of the carriages is restarted when the reduced pitch is returned to the operational pitch due to the advancing of the immediately preceding carriage. It can be appreciated that production losses are reduced by continuing to advance upstream carriages after a stoppage to form an online dynamic buffer. Additionally, it can be appreciated that the online buffer further reduces production losses due to subsequent stoppages upstream of the online buffer. Furthermore, it can be appreciated that the continued advancement of upstream carriages even further reduces production losses due to gaps located upstream of a subsequent stoppage.

BRIEF DESCRIPTION OF THE SEVERAL VIEWS OF THE DRAWING

These and further features of the present invention will be apparent with reference to the following description and drawings, wherein:

FIGS. 1A to 1E diagrammatically illustrate typical operation of a production line having a first stoppage or trouble spot and a subsequent second stoppage located upstream of the first stoppage;

FIG. 3A is an elevational view of a portion of a production line operating according to the present invention and showing a fixed operational pitch between carriages of an overhead conveyor;

FIG. 3B is an elevational view similar to FIG. 2A showing a reduced pitch between carriages in response to a stoppage or trouble spot;

FIG. 3C is an elevational view similar to FIG. 2B showing a return of the reduced pitch to the fixed operational pitch between carriages after a restart of the stoppage;

FIG. 4 is an elevational view of an interface between adjacent carriages of the conveyor of FIGS. 2A to 2C;

FIG. 5 is an elevational view of an alternative interface between adjacent carriages of the conveyor of FIGS. 2A to 2C similar to FIG. 3;

FIGS. 6A to 6E diagrammatically illustrate operation of a production line according to the present invention and having a first stoppage or trouble spot and a subsequent second stoppage located upstream of the first stoppage; and FIGS. 7A to 7D diagrammatically illustrate operation of the production line similar to FIGS. 6A to 6E but having a stoppage downstream of a gap formed by a previous stoppage.

DETAILED DESCRIPTION OF PREFERRED EMBODIMENTS

Figure 2A:
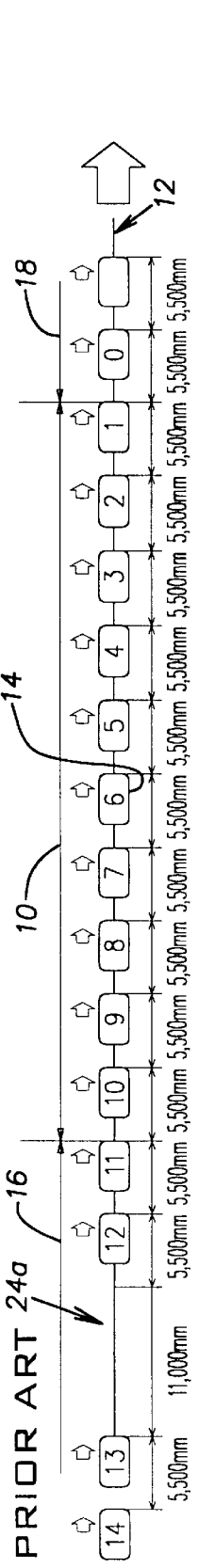
FIGS. 2A to 2D diagrammatically illustrate operation of the production line similar to FIGS. 1A to 1E but having a stoppage or trouble spot located downstream of a gap formed by a previous stoppage.
Figure 2B:
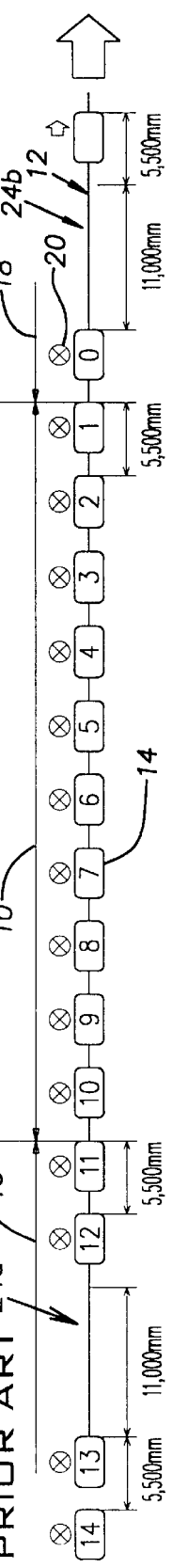
Figure 2C:
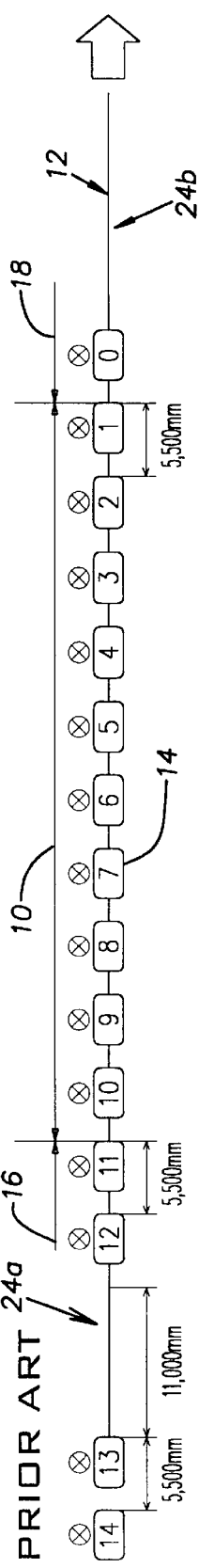
Figure 2D:
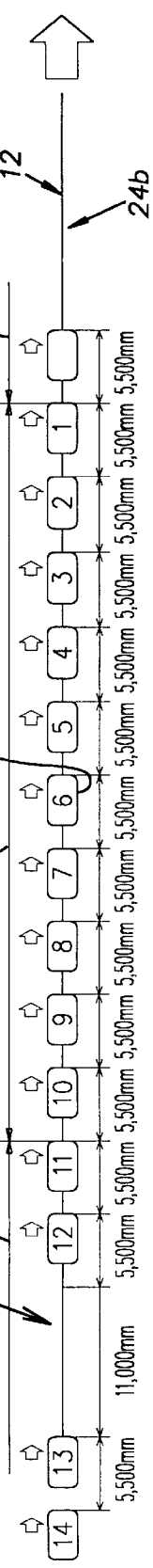

FIGS. 3A–3C illustrate a portion of an automobile production line 26 incorporating the present invention and having an overhead-type conveyor 28. The conveyor 28 includes an overhead rail 30, carriages or cars 32 hung from the rail 30 and movable thereon, and hangers 34 hung from the carriages 32. The hangers 34 support workpieces 36 such as the illustrated vehicle bodies. It is noted that the workpieces 36 are not limited to automobiles and can be a wide variety of items to be assembled within the scope of the present invention. The overhead-type conveyor 28 is typically utilized for operations incorporating components to be disposed on the underside of the vehicle body 36. It should be understood, however, that other types of conveyors can be utilized within the scope of the present invention such as, for example, a floor-type conveyor which is used for automobile assembly operations incorporating components to be disposed on the inside or topside of the vehicle body 36, such as installing interior and exterior trim.

Each of the carriages 32 are self-propelled, that is separately provided with driving and control devices 38, and are typically moved along the rail 30 in a continuous manner. It should be understood, however, that the carriages 32 can alternatively be moved in an indexing fashion wherein the carriages are intermittently moved a predetermined distance at regular intervals within the scope of the present invention. The carriages 32 normally move at a fixed operational speed and a fixed operational pitch 40 (the distance from the front of one carriage 32a to the front of the adjacent carriage 32b) which provide a required processing time for each of the operations in the work zones along the production line 26. It should be noted, that the speed of the carriages 32 can vary at points along the production line 26 in a predetermined manner such as, for example, increasing the speed into or out of a work zone, and as a result the pitch between the carriages 32 briefly varies at that time.

As best shown in FIG. 3A, the fixed operational pitch 40 of the illustrated example is 5,500 mm. The operational pitch 40 between the carriages 32 is maintained as close as possible to 5,500 mm, depending on the accuracy of sensors and other factors, so the required processing time is obtained along each work station of the entire production line 26.

As best shown in FIG. 3B, when a stoppage or trouble spot develops in the production line and the carriage 32a at the trouble spot is stopped, the carriage 32b immediately behind the stopped carriage 32a detects the stoppage and also stops. The immediately following carriage 32b, however, stops at a reduced pitch 42 which is preferably as close as possible to the initially stopped carriage 32a. Therefore, the fixed operational pitch 40 is not maintained when the carriages 32a, 32b are stopped. The reduced pitch 42 is preferably the smallest possible pitch, that is, the pitch equal to the distance which makes the carriages 32 as tight as mechanically possible without contacting while still maintaining a required clearance 44 between the workpieces 36. In the illustrated example, the reduced pitch 42 is equal to 5,000 mm. The fixed operational pitch 40 can be reduced behind the stoppage because it is not necessary to worry about the processing time of the workpiece 36 of the immediately following carriage 32b while the preceding carriage 32a is stopped.

The carriages 32 upstream of the stoppage continue to move forward along the production line 26 despite the downstream stoppage until they detect the stoppage of the preceding carriage 32 and in turn stop at the reduced pitch 42. Continued movement of the upstream carriages allows the upstream portion of the production line to continue to operate and create a dynamic online buffer behind the stoppage. It can be appreciated that keeping the upstream carriages moving can also close previously existing gaps located upstream of the stoppage as described in more detail hereinafter.

In the illustrated embodiment, where the fixed operational pitch 40 is equal to 5,500 mm and the reduced pitch 42 is equal to 5,000 mm, a buffer of one workpiece 36 is obtained for every ten stopped workpieces 36. The number of stopped carriages 32, that is the size of the buffer, continues to increase in an upstream direction as the carriages 32 continue to reach the stoppage and in turn stop at the reduced pitch 40 until the entire upstream portion of the production line is jammed at the reduced pitch 40 or the first carriage 32a of the stoppage is restarted.

As best shown in FIG. 3C, when the first stopped carriage 32a is restarted, the immediately following carriage 32b is not restarted at the same time. The immediately following carriage 32b remains stopped until the reduced pitch 42, relative to the preceding carriage 32a, is returned to the fixed operational pitch 40. Therefore, the required processing time is maintained as the carriages 32a, 32b move through the remainder of the production line 26. The online buffer remains because the carriages 32 are restarting from the forward end of the buffer at the same rate as the downstream carriages 32 are stopping at the rearward end of the buffer. The remaining online buffer, however, travels in an upstream direction. It can be appreciated that keeping the online buffer compensates for stoppages which subsequently occur upstream of the buffer as described in more detail hereinafter.

The fixed operational pitch 40 can be changed to the reduced pitch 42 in response to a stoppage and returned upon restarting by providing the forward end of each carriage 32 with a sensor 46 which detects either the tail end of the preceding carriage 32 or the distance to the preceding carriage 32. The sensor 46 can be of any commonly known type such as, for example, proximity sensors or distance sensors.

As best shown in FIG. 4, the sensor 46 can be a proximity sensor 46a attached to the forward end of the following carriage 32b which cooperates with a plate 48 attached to the rearward end of the preceding carriage 32a. The proximity sensor 46a can be of any commonly known type. The proximity sensor 46a cooperates with the plate 48 to detect the presence of the preceding carriage 32a. When the proximity sensor 46a detects the presence of the preceding carriage 32a, the driving and control device 38 recognizes the stoppage and stops the following carriage 32b. The proximity sensor 46a and the plate 48 should be sized and positioned such that the following carriage 32b can be stopped at the reduced pitch 42 without colliding with the preceding carriage 32a.

When the presence of the preceding carrier 32a is no longer detected by the proximity sensor 36a, the driving and control device 38 recognizes that the preceding carriage 32a has restarted. The following carrier 32b, which knows the fixed operational speed, calculates how much time is needed to increase the reduced pitch 42 to the fixed operational pitch 40. When the calculated time period has elapsed since the recognized restart, the driving and control device 38 of the following carrier 32b restarts the following carrier 32b so that the pitch between the preceding carrier 32a and the following carrier 32b is again equal to the fixed operational pitch 40.

As best shown in FIG. 5, the sensor 46 can alternatively be a distance sensor 46b attached to the forward end of the following carriage 32b which cooperates with a refraction plate 50 attached to the rearward end of the preceding carriage 32a. The distance sensor 46b can be of any commonly known type. The distance sensor 46b cooperates with the refraction plate 50 to detect the distance between the forward end of the following carriage 32b and the rearward end of the preceding carriage 32a. When the distance sensor 46a detects a distance which added to the fixed length of the carriages 32 is less than the fixed operational pitch 42, the driving and control device 38 recognizes the stoppage of the preceding carriage 32a and stops the following carriage 32b at the reduced pitch 42.

When the distance detected by the distance sensor 36b is greater than the reduced pitch 42, the driving and control device 38 recognizes that the preceding carriage 32a has restarted. The following carrier 32b restarts when the distance sensor 32b detects that the distance between the preceding carrier 32a and the following carrier 32b added to the fixed length of the carriers 32 is again equal to the fixed operational pitch 40.

FIGS. 6A to 6E illustrate a work zone 52 of the production line 26 during operation according to the present invention. The carriages 32 are entering the work zone 52 from a preceding work zone 54 and are exiting to a subsequent work zone 56. As best shown in FIG. 6A, the carriages 32 are moving at the fixed operational speed and the fixed operational pitch 40 in a forward direction (left to right as viewed in FIG. 6A).

As shown in FIG. 6B, a first trouble spot or stoppage 58 such as a production or equipment problem causes one of the carriages 32 to be stopped. In the illustrated example, it is the last carriage 32 (carriage No. 0) in the subsequent work zone 56 which is stopped. When the carriage 32 (carriage No. 0) is stopped, each of the carriages 32 upstream of the stopped carriage 32 (carriage No. 0) continue to move forward until the reduced pitch 42 is reached with the preceding carriage 32. Therefore, the upstream carriages 32 continue to move forward until there is no longer any more than the allowed space to the preceding stopped carriage 32. Therefore, the number of stopped carriages 32 continues to grow as the first stopped carriage 32 (carriage No. 0) remains stopped until the entire upstream portion of the production line 26 is jammed at the reduced pitch 42 or the first stopped carriage 32 (carriage No. 0) is restarted.

FIG. 6B illustrates the production line 26 at the instant when eleven carriages 32 (Carriage Nos. 1 to 11) have stopped upstream of the first stopped carriage 32 (carriage No. 0) so that the entire work zone 52 is jammed with stopped carriages 32. Each of carriages 32 have stopped at the illustrated reduced pitch 42 of 5,000 mm. Because the carriages 32 have stopped at the reduced pitch 42 rather than the fixed operational pitch 40, there are eleven carriages 32 (carriage Nos. 1 to 11) within the distance where there would otherwise only be ten (compare the work zone 52 in FIGS. 6A and 6B). Therefore, a dynamic online buffer of an additional carriage has been created by the reduced pitch and continued operation of the upstream portion of the production line 26. It can be appreciated, therefore, that continued operation of the upstream portion of the assembly line 26 reduces the amount of lost production due to the stoppage 58.

When the first stopped carriage 32 (carriage No. 0) is restarted, the subsequent carriages 32 are not started until each pitch is returned to the fixed operational pitch 40 of 5,500 mm. FIG. 6C illustrates the production line 26 at the instant when the first subsequent carriage 32 (carriage No. 1) is restarted. It can be seen that the first subsequent carriage (carriage No. 1) did not restart until the first stopped carriage 32 (carriage No. 0) had advanced far enough for the reduced pitch 42 to return to the fixed operational pitch 40 of 5,500 mm. The remaining stopped carriages (32) each progressively restart as the reduced pitch 42 with the preceding carriage 32 returns to the fixed operational pitch 40. Because the stopped carriages 32 do not immediately restart and the upstream portion of the production line 26 continues to move, upstream carriages 32 continue to stop at the same rate as the downstream carriages 32 restart. Therefore, the number of stopped carriages 32 remains the same but the position of the stopped carriages 32 travels in an upstream direction (compare the position of the stopped carriages 32 in FIGS. 6B and 6C). As the carriages 32 forwardly move along the production line 26 after restarting, they continue to move at the fixed operational pitch 40 and the fixed operational speed so that the required processing time is maintained.

FIG. 6D illustrates the production line 26 after there has been a second trouble spot or stoppage 60 upstream of the buffer or group of stopped carriages 32. The stopped carriages 32 downstream of the second stoppage 60 continue to successively restart as the reduced pitch 42 returns to the fixed operational pitch 40. FIG. 6D illustrates the instant at which the last stopped carriage 32 (carriage No. 13) of the buffer restarts. Each carriage 32 downstream of the second stoppage 60 continues to forwardly move along the production line 26 at the fixed operational speed and the fixed operational pitch 40.

The carriages 32 upstream of the second stoppage 60 progressively stop at the reduced pitch 42 as described above with regard to the first stoppage 58. Therefore, a second dynamic online buffer similar to the above described first buffer is formed behind the second stoppage 60.

FIG. 6E illustrates the production line at the instant when the first carriage 32 (carriage No. 14) of the second stoppage 60 is restarted. In the illustrated example, the second stoppage 60 is restarted at the instant the last carriage 32 (carriage No. 13) of the first buffer is restarted. It can be seen that the first buffer was utilized during the second stoppage 60 so that a space or gap did not form immediately downstream of the second stoppage 60. After restarting the second stoppage 60, the carriages 32 forwardly move along the production line 26 at the fixed operational pitch 40 and the fixed operational speed without a gap being formed. It can be appreciated that utilizing the first buffer to prevent the gap results in no lost production downstream due to the second stoppage 60.

FIGS. 7A to 7D show the effect of continued operations upstream of the stoppage when there is already a gap 62 located upstream of the stoppage 58. As best shown in FIG. 7A, the carriages 32 are moving at the fixed operational speed and the fixed operational pitch 40 in a forward direction (left to right as viewed in FIG. 6A). In the illustrated example, the gap 62 is located between the second and third carriages 32 (carriage Nos. 12 and 13) in the preceding work zone 54. The illustrated gap 62 is equivalent to two missing carriages 32, that is, equal to twice the operational pitch 40. It should be noted, however, that the gap 62 could be equal to a fewer or greater number of missing carriages 32.

As shown in FIG. 7B, the first stoppage 58 causes one of the carriages 32 to be stopped. In the illustrated example, it is the last carriage 32 (carriage No. 0) in the subsequent work zone 56 which is stopped. When the carriage 32 (carriage No. 0) is stopped, each of the carriages 32 upstream of the stopped carriage 32 (carriage No. 0) continue to move forward until the reduced pitch 42 is reached with the preceding carriage 32 as described hereinbefore.

FIG. 7B illustrates the production line 26 at the instant when the carriages downstream of the stoppage 58 have moved a distance equal to twice the operational pitch 40. At this time, twelve carriages 32 (Carriage Nos. 1 to 12) have stopped upstream of the first stopped carriage 32 (carriage No. 0) so that the entire work zone 52 is jammed with stopped carriages 32. Each of carriages 32 have stopped at the illustrated reduced pitch 42 of 5,000 mm. Therefore, the dynamic online buffer has been created as described hereinbefore. Additionally, the size of the upstream gap 62 has been reduced because the carriages 32 (carriage Nos. 13 to 15) are continuing to advance at the operational speed. At this instance, the size of the gap 62 is equivalent to one missing carriage 32, that is, equal to the operational pitch 40. Because each of the carriages 32 downstream of the stopped carriage 32 (carriage No. 0) continues forward along the production line 26, another gap 64 has formed downstream of the stoppage 20. At this instance, the size of the downstream gap 64 is equivalent to two missing carriages 32, that is, equal to twice the operational pitch 40.

FIG. 7C illustrates the production line 12 at the instant when the carriages 14 preceding the stopped carriage have progressed a distance equal to four times the fixed pitch. The size of the upstream gap 62 has been completely eliminated as additional carriages 32 have stopped at the reduced pitch 42 at the rear end of the buffer as the size of the buffer grows in the upstream direction. The size of the downstream gap 64, however has grown to four times the fixed pitch because the carriages 14 located downstream of the stoppage 20 continue to advance forward at the operational speed.

When the first stopped carriage 32 (carriage No. 0) is restarted, the subsequent carriages 32 are not started until each pitch is returned to the fixed operational pitch 40 of 5,500 mm as described hereinbefore. FIG. 7D illustrates the production line 26 at the instant when the first subsequent carriage 32 (carriage No. 1) is restarted. As the carriages 32 at the forward end of the buffer are restarted carriages 32 at the rear end of the buffer are stopping so that the online buffer travels in an upstream direction as described hereinbefore. It can be appreciated that continued operation of the upstream portion of the assembly line 26 during the stoppage 58 reduced the amount of lost production because the gap 62 was eliminated.

Although particular embodiments of the invention have been described in detail, it will be understood that the invention is not limited correspondingly in scope, but includes all changes and modifications coming within the spirit and terms of the claims appended hereto.

What is claimed is:

1. A method of operating a production line comprising the steps of:

advancing a plurality of self-propelled carriages in a forward direction along the production line at an operational speed and an operational pitch between adjacent ones of said carriages;

stopping a first one of said carriages from advancing in said forward direction;

stopping a second one of said carriages immediately following said first one of said carriages from advancing in said forward direction when a reduced pitch between said first and second ones of said carriages is obtained, wherein said reduced pitch is less than said operational pitch;

restarting said first one of said carriages to advance in said forward direction; and restarting said second one of said carriages to advance in said forward direction after said step of restarting said first one of said carriages and advancement of said first one of said carriages has returned said reduced pitch to said operational pitch.

2. The method according to claim 1, wherein said reduced pitch corresponds to a minimum distance available between the carriages.

3. The method according to claim 1, further comprising the step of said second one of said carriages sensing the presence of said first one of said carriages to indicate stopping and restarting of the first one of said carriages.

4. The method according to claim 1, further comprising the step of said second one of said carriages sensing the distance to said first one of said carriages to indicate stopping and restarting of the first one of said carriages.

5. The method according to claim 1, further comprising the step of continuing to advance a third one of said carriages immediately preceding said first one of said carriages in said forward direction when said first one of said carriages is stopped to form a gap between said first and third ones of said carriages, said gap being greater than said operational pitch.

6. The method according to claim 5, wherein said gap is maintained when said first one of said carriages is restarted until there is a subsequent downstream stoppage of one of said carriages.

7. The method according to claim 1, wherein said self-propelled carriages are each advanced by a separate drive and control device carried thereon.

8. The method according to claim 1, wherein said self-propelled carriages are advanced unconnected to one another.

9. The method according to claim 1, wherein said operational speed is a fixed operation speed.

10. The method according to claim 1, wherein said operational pitch is a fixed operation pitch between adjacent ones of said carriages.

11. The method according to claim 1, wherein said step of stopping said second one of said carriages includes stopping said second one of said carriages without engaging said first one of said carriages.

12. A method of operating a production line comprising the steps of:
advancing a plurality of self-propelled carriages along the production line in a forward direction at an operational speed and an operational pitch between adjacent ones of said carriages;
stopping a first one of said carriages from advancing in said forward direction when a reduced pitch between said first one of said carriages and a second one of said carriages immediately preceding said first one of said carriages is obtained due to a stoppage of one of said carriages, wherein said reduced pitch is less than said operational pitch; and
restarting the first one of said carriages to advance in said forward direction when forward advancement of said second one of said carriages has returned said reduced pitch to said operational pitch.

13. The method according to claim 12, wherein said reduced pitch corresponds to a minimum distance available between the carriages.

14. The method according to claim 12, further comprising the step of sensing the presence of a preceding carriage to indicate stopping and restarting of said preceding carriage.

15. The method according to claim 12, further comprising the step of sensing a distance to a preceding carriage to indicate stopping and restarting of said preceding carriage.

16. The method according to claim 12, further comprising the step of continuing advancement of a third one of said carriages immediately downstream of said stoppage in said forward direction to form a gap between said stoppage and said third one of said carriages, said gap being greater than said operational pitch.

17. The method according to claim 13, wherein said gap is maintained when said first one of said carriages is restarted until there is a subsequent downstream stoppage of one of said carriages.

18. The method according to claim 12, wherein said self-propelled carriages are each advanced by a separate drive and control device carried thereon.

19. The method according to claim 12, wherein said self-propelled carriages are advanced unconnected to one another.

20. The method according to claim 12, wherein said operational pitch is a fixed operation pitch between adjacent ones of said carriages.

21. The method according to claim 12, wherein said operational speed is a fixed operation speed.

22. The method according to claim 12, wherein said step of stopping said first one of said carriages includes stopping said first one of said carriages without engaging said second one of said carriages.

23. A method of operating a production line comprising the steps of:
advancing a plurality of self-propelled carriages along the production line at an operational speed and with a fixed operational pitch between adjacent ones of said carriages, said self-propelled carriages being advanced unconnected to one another and each being advanced by separate drive and control devices carried thereon;
stopping a first one of said carriages;
stopping a second one of said carriages immediately following said first one of said carriages when a reduced pitch between said first and second ones of said carriages is obtained, said reduced pitch being less than said operational pitch;
continuing to advance a third one of said carriages immediately preceding said first carriage when said first one of said carriages is stopped to form a gap between said first and third ones of said carriages, said gap being greater than said operational pitch;
restarting said first one of said carriages, said gap being maintained when said first one of said carriages is restarted; and
restarting said second one of said carriages after advancement of said first one of said carriages has returned said reduced pitch to said fixed operational pitch.

* * * * *